UNITED STATES PATENT OFFICE.

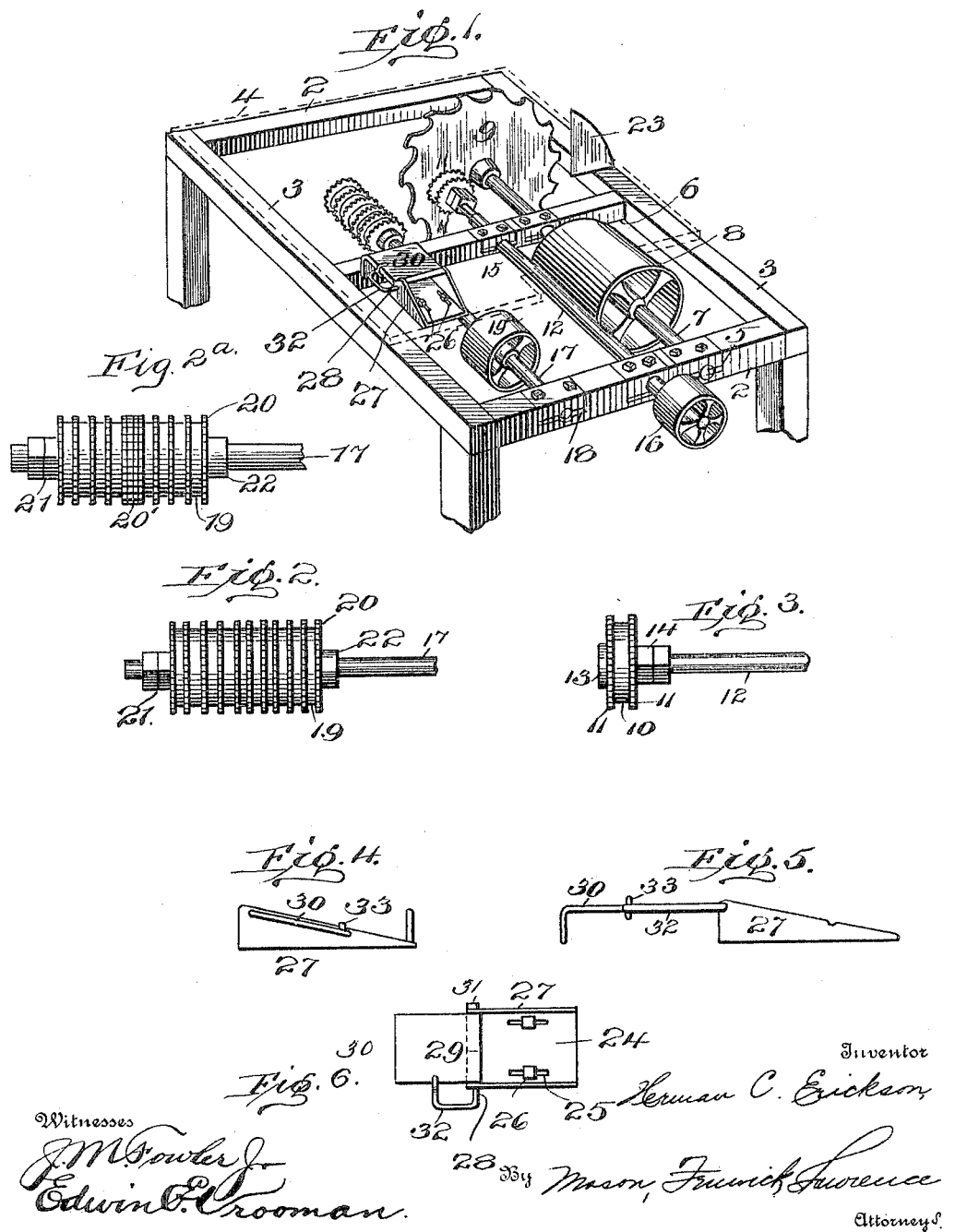

HERMAN C. ERICKSON, OF SEATTLE, WASHINGTON.

MACHINE FOR PRODUCING LATH-BOLTS.

No. 820,855.     Specification of Letters Patent.     Patented May 15, 1906.

Application filed February 11, 1905. Serial No. 245,305.

*To all whom it may concern:*

Be it known that I, HERMAN C. ERICKSON, a citizen of the United States, residing at Seattle, in the county of King and State of Washington, have invented certain new and useful Improvements in Machines for Producing Lath-Bolts; and I do hereby declare the following to be a full, clear, and exact description of the invention, such as will enable others skilled in the art to which it appertains to make and use the same.

My invention relates to machines for producing wooden bolts adapted to be subsequently cut into laths; and the object of the machine is to provide means whereby material may be mechanically fed to the saw and the partly-cut-off portion thereof supported in close proximity to the saw.

A further object is to provide mechanism whereby a large opening may be formed in the table of the machine and adjacent the saw to prevent clogging or jamming by sawdust, slivers, &c., and at the same time enable the bolt or the severed portion thereof to be carried past the saw without sagging or becoming accidentally displaced.

A further object of the invention is to provide a gage of novel construction which can be quickly adjusted for use in producing wide or narrow bolts or billets.

A still further object of the invention is to provide a feeding-roll formed of detachable members, any one of which can be quickly removed and replaced in case of wear or breakage.

With the above and other objects in view the invention consists in certain other novel constructions, combinations, and arrangements of parts, as will be hereinafter fully described and claimed.

In the accompanying drawings, Figure 1 is a perspective view of a machine constructed in accordance with my invention, the top of the table being shown by dotted lines. Fig. 2 is a front elevation of the main feeding-roll. Fig. 2ª is a front elevation of another embodiment of the main feeding-roll. Fig. 3 is a similar view of the second feeding-roll. Fig. 4 is a side elevation of the gage detached and folded. Fig. 5 is a similar view showing the same extended, and Fig. 6 is a reduced top plan view of the extended gage.

Referring to the figures by numerals of reference, 1 1 are supports on which are mounted end beams 2 and side beams 3, constituting the framework of the table-top. These beams are adapted to support a top 4 of any preferred construction and which has been shown by dotted lines, Fig. 1. Journaled within suitable bearings 5, carried by one of the end beams 2 and an intermediate beam 6, is a saw-carrying shaft 7, having a pulley 8 thereon adapted to be driven from any suitable source of power by a belt. (Not shown.) A circular saw 9 is secured at one end of the shaft 7. It will be understood that this shaft extends under the table-top 4, and therefore the saw 9 projects through said top. The slot through which the saw projects has not been shown, but is preferably of considerable width, so as to prevent splinters, &c., from jamming between the saw and the walls of the slot.

In order that the partly-severed billet or bolt can be firmly supported even though the slot through which the saw 9 projects is of considerable width, I have provided a novel form of roller. As shown in Fig. 3, this roller consists of a central disk 10, on each end of which is clamped a toothed disk 11, the diameter of which is slightly greater than disk 10. These disks are secured to one end of the primary shaft 12 by means of a thin solid head or binding-nut 13, which serves to press the disks against nuts 14, mounted on the shaft. As the head or nut 13 is very thin, the outer disk 11 can be brought into close proximity to one face of the saw 9. The shaft 12 is mounted in suitable bearings 15, arranged in the intermediate beam 6 and one end beam 2, and a pulley 16 is secured to this shaft and is adapted to receive motion from a belt. (Not shown.) A third or auxiliary shaft 17 is journaled in bearings 18 in end beam 2 and intermediate beam 6 and is likewise provided with a pulley 19 for receiving power from a belt. (Not shown.) This shaft extends across the face of saw 9 at a suitable distance in front thereof and has a feeding-roll thereon which is of novel construction. As shown in Fig. 2, this roll consists of toothed disks 20, separated by a series of smooth spacing-disks 19. All of these disks are secured upon the shaft 17 by means of binding-nuts 21, which serve to clamp them against a collar 22, arranged on the shaft. That portion of the feeding-roller directly in line with the saw consists entirely of toothed disks 20, Fig. 2ª, so as to form a positive feed for that portion of the material contacting with the teeth of the saw.

It will be understood, of course, that all of the shafts of this machine extend under the table-top 4 and said top is provided with openings through which the disks 11 and 20 project, said disks being only projected a distance above the table-top approximately equal to the length of their teeth. The pulleys 8, 16, and 19 are preferably located at one side of the table-top. A separator 23 in the form of a wedge-shaped plate is secured to the table directly in rear of the saw for the purpose of spreading the slot cut into the material, and thereby preventing said material from binding on the saw-blade during the cutting process.

In order that bolts of proper widths may be cut, I employ a gage of peculiar form. This gage is secured to the table-top 4 and is formed of two members. The base member consists of a plate 24, having longitudinally-disposed slots 25 therein for the reception of securing-bolts 26, whereby said plate may be adjusted longitudinally and then secured. Wedge-shaped flanges 27 extend upwardly from the side edges of plate 24, and rotatably mounted in the upper corners of these flanges is a rod 28, which projects through the bead 29, formed at one edge of an L-shaped plate 30, forming the second or movable member of the gage. The rod is held in place at one end by a nut 31, while its other end is bent to a substantially U shape to form a handle 32, and the end of this handle is forked, as at 33, and engages the adjoining edge of member 30. By means of this handle the member 30 can be swung backwardly into position between the flanges 27 or can be swung forward, as shown in Figs. 5 and 6, to elongate the gage.

When it is desired to cut billets or bolts by means of this machine, the block to be sawed is placed on the table-top 4 and is engaged by the teeth of disks 20 and carried forward thereby into contact with the cutting edge of saw 9. It will of course be understood that the gage will accurately designate the proper position in which the block is to be placed upon the table. As soon as the saw cuts into the block that portion thereof being severed will be engaged by the teeth of disks 11 and carried across the face of the saw and supported. The partly-severed strip is thus prevented from sagging, and thereby interfering with the action of the saw. Moreover, when the strip passes the saw-blade the same is spread from the balance of the block by means of the wedge-shaped attachment 23. By grasping handle 32 and swinging the movable member 30 of the gage forward or backward a billet of desired width can be produced.

It will of course be understood that if one or more of the disks of either roller become worn or broken it can be readily replaced by removing the clamping devices.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having now described my invention, what I claim as new, and desire to secure by Letters Patent, is—

1. In a mechanism of the class described, the combination with a frame, of a saw-carrying, a primary, and an auxiliary shaft journaled upon said frame, all of the shafts terminating short of one and the same end of said frame, a rotatable saw fixedly secured near the inner end of said saw-carrying shaft, abutting, toothed disks secured upon said auxiliary shaft in alinement with the rotatable saw and spaced toothed disks upon said shaft at opposite sides of the abutting toothed disks, removable toothed disks positioned upon the inner end of said primary shaft, between the disks of said auxiliary shaft and the saw-carrying shaft, said disks carried by the primary shaft positioned within the limit of the cutting edge of said rotatable saw, a smooth disk interposed between said toothed disks carried by said primary shaft, and locking-nuts carried by said primary shaft and in engagement with one of said toothed disks for securing the same in a fixed position.

2. In a machine of the character described, the combination with a cutting element, of a shaft at one side thereof and extending into close proximity thereto, spaced toothed disks upon the shaft and adjacent to and within the limit of the cutting edge of said cutting element, means for detachably securing the disks to the shaft, and a feeding element in front of the cutting element and comprising a shaft, a series of abutting toothed disks upon the shaft and alining with the cutting element and spaced toothed disks upon the shaft at opposite sides of said abutting disks.

3. In a mechanism of the class described, the combination with a frame, of a saw-carrying shaft journaled thereon, the inner end of said saw-carrying shaft terminating short of one of the sides of the frame, a revoluble saw fixedly secured near the inner end of said shaft, a primary shaft secured parallel to said saw-carrying shaft, removable toothed disks positioned upon the inner end of said primary shaft, a smooth disk interposed between said toothed disks, locking-nuts carried by said shaft for securing said smooth and the toothed disks in a fixed position, said disks positioned within the limit of the edges of said saw, an auxiliary shaft secured parallel to said primary and saw-carrying shafts, the inner end of said auxiliary shaft terminating short of one of the ends of said frame, a removable toothed disk positioned upon the inner end of said auxiliary shaft, and means for securing said disk in a fixed position.

In testimony whereof I affix my signature in presence of two witnesses.

HERMAN C. ERICKSON.

Witnesses:
G. WARD KEMP,
C. C. PHILLIPS.